US006447824B2

(12) United States Patent
Watanabe et al.

(10) Patent No.: US 6,447,824 B2
(45) Date of Patent: Sep. 10, 2002

(54) SUBSTITUTE FOR EDIBLE OIL AND FAT

(75) Inventors: Akihiro Watanabe; Chie Sasaki; Masahiko Nonaka; Hideshi Matoba, all of Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 14 days.

(21) Appl. No.: 09/725,517

(22) Filed: Nov. 30, 2000

(30) Foreign Application Priority Data

Dec. 1, 1999  (JP) ............................................ 11-341571
Oct. 27, 2000  (JP) ......................................... 2000-328520

(51) Int. Cl.[7] ................................................. A21D 2/00
(52) U.S. Cl. .......................... 426/74; 426/549; 426/555; 426/601; 426/804; 426/97; 426/89
(58) Field of Search ................................ 426/549, 555, 426/73, 74, 601, 609, 610, 603, 604, 605, 606, 607, 657, 97, 89

(56) References Cited

U.S. PATENT DOCUMENTS

| 4,734,287 A | | 3/1988 | Singer et al. | |
| 4,931,491 A | * | 6/1990 | Savin | 523/443 |
| 4,976,997 A | * | 12/1990 | Stockel et al. | 101/465 |
| 5,098,938 A | * | 3/1992 | Savin | 523/220 |
| 5,137,796 A | * | 8/1992 | Takiguchi et al. | 430/106.1 |
| 5,194,270 A | | 3/1993 | Cante et al. | |
| 5,679,877 A | * | 10/1997 | Erilli et al. | 510/218 |
| 6,139,610 A | * | 10/2000 | Sinko | 106/14.05 |
| 6,194,070 B1 | * | 2/2001 | Lynch et al. | 428/405 |

FOREIGN PATENT DOCUMENTS

| JP | A-01-120248 | 5/1989 |
| JP | A-01-187051 | 7/1989 |
| JP | A-01-187052 | 7/1989 |
| JP | A-02-242656 | 9/1990 |
| JP | A-03-505814 | 12/1991 |
| JP | A-04-502102 | 4/1992 |
| JP | A-06-335365 | 12/1994 |
| JP | A-2000-23626 | 1/2000 |

* cited by examiner

Primary Examiner—Carolyn Paden
(74) Attorney, Agent, or Firm—Oblon, Spivak, McClelland, Maier & Neustadt, P.C.

(57) ABSTRACT

A substitute for edible oil and fat, which contains fine particles having an average particle size of 250 microns or less and a surface hydrophobic degree of 35 g or less as the oil absorption measured by the oil absorption assay method of JIS K6223, as well as a food containing the substitute for edible oil and fat. The substitute for edible oil and fat renders possible achievement of low oil content and low calorie of food mainly including bakery products.

16 Claims, 1 Drawing Sheet

SUBSTITUTE FOR EDIBLE OIL AND FAT

BACKGROUND OF THE INVENTION

1. Field of the Invention

This invention relates to a substitute for edible oil and fat, which renders possible achievement of low oil content and low calorie foods mainly including bakery products in the field of food.

2. Discussion of the Background

Development of low oil and fat food for a large number of people under excess oil and fat ingestion condition have been required and actually various substitutes for oil and fat have been produced. These substitutes for oil and fat are roughly divided into use of a hardly digestible substance having oily properties and a case in which the properties of oil and fat are supplied by increasing the water content and adding other processed substance to the aqueous phase.

Typical examples for the former case include a sucrose fatty acid ester, trade name Olestra, manufactured by P & G. However, since oil soluble vitamins essential for the living body are dissolved into these substances and excreted as such, they have problems such as the limitation in the amount of ingestion.

As examples for the latter case, substances in a w/o type emulsion form having considerably large water content and using an emulsifying agent have been proposed (JP-A-01-120248, JP-A-01-187051, JP-A-01-187052; the term "JP-A" as used herein means an "unexamined published Japanese patent application"). Since these substances use a condensed recinoleic acid ester as a strong w/o type emulsifying agent and this emulsifying agent has a peculiar flavor, they have problems such as no applicability to the products having flavor as an important factor.

In addition, certain substances having the palate reception characteristics of fat by dispersing a substance derived from starch or polysaccharide, a microcrystalline cellulose or a fine-structured protein in the water phase have been proposed. Their illustrative examples include a fine cellulose-containing food composition described in JP-A-06-335365, an ionic polysaccharide/protein micro-fragment complex dispersion described in a Japanese national phase publication No. JP-A-03-505814, a proteinous water-dispersible macro-colloid comprised of non-coagulating particles of milk cow whey protein (trade name Simplex) described in U.S. Pat. No. 4,734,287 and a hydrophobic protein such as prolamin described in JP-A-04-502102.

The term "palate reception characteristics of fat" as used herein means tastes such as creaminess and smoothness. The above substances can be used in certain food where oil and fat take a role to add creamy and smooth tastes, such as mayonnaise, butter cream, cream filling, dressing and spread, but it is difficult to expect a shortness effect in bakery products, namely an effect to bake bread having fine texture through large expansion of bread at the time of fermentation and baking.

In addition, as described in JP-A-02-242656 (JP-B-7-28696; the term "JP-B" as used herein means an "examined Japanese patent publication"), there is a low calorie fat substitute composition in which poly-dextrose or cellulose is coated with fat. This substance has a calorie value of from about 1.5 kcal/g to 6 kcal/g, but the calorie value is still high. When a fat-coated powdery cellulose substance was produced by a method described in this document (a method according to Example 3) at a ratio of cellulose (average particle size 10 microns)/fat=1/1 which seemed to have most lower oil absorption, its oil absorption was 49.7 g. (Definition of the oil absorption will be described later.)

As described in U.S. Pat. No. 5,1194,270, there is a case to produce a low calorie oil and fat composition by dispersing calcium citrate in a vegetable oil, and it describes that a substitute having a viscosity similar to the solid fat can be produced in this case by preparing plate crystals of calcium citrate by a special method and dispersing the crystals in liquid oil. However, since the plate crystals are used by dispersing (from 0.1 to 35% by weight) in oil and fat, the calorie reduction is low.

Also, since water solubility of calcium citrate crystals is 0.1 g at 25° C., their dispersibility in water is markedly high, and it has been revealed that their "oil absorption" which will be described later is markedly higher than the value specified by the present invention so that their hydrophilic nature is fairly high. In addition, even calcium citrate in which 1.5% of stearic acid was-adhered to the surface showed an oil absorption of 60 g. Also, calcium citrate in which 10% of stearic acid was adhered to the surface showed an oil absorption of 48 g. Based on these results, it was revealed that calcium citrate is a substance which hardly forms a hydrophobic surface.

As a result of a baking test using such crystals, the effect to bake bread having fine texture through large expansion of bread at the time of fermentation and baking was not found.

The shape of commercially available calcium citrate was observed under an electron microscope, and found that it was not a plate crystal but a three-dimensional shape. Since it is known that hydrophobic substances are generally difficult to be adhered to the surface of plate crystals, it is assumed that the calcium citrate plate crystal of this document is a substance which more hardly forms a hydrophobic surface.

In this connection, JP-A-2000-23626 (Riken Vitamin) discloses a "hardly soluble mineral composition having excellent dispersion stability in liquid substance, in which an emulsifying agent having an HLB value of 6 or less is blended with a slightly soluble mineral". This is a composition in which water dispersibility is improved by the adhesion of hydrophilic moiety of an emulsifying agent having an HLB value of 6 or less to the surface of slightly soluble mineral particles, which seems to be considerably larger than the oil absorption of 35 g as defined in the present invention, so that this invention is different from that of the present invention.

SUMMARY OF THE INVENTION

An object of the present invention is to provide a substitute for oil and fat, which has no peculiar flavor, does not extract fat-soluble vitamins from the body and has a shortness effect in bakery products, namely an effect to bake bread having fine texture through large expansion of bread at the time of fermentation and baking, as well as food articles such as bread products which contain the substitute for oil and fat.

The invention includes each of the following embodiments regarding substitutes for oil and fat having excellent characteristics as described in the foregoing and food products containing the same.

(1) A substitute for edible oil and fat, which comprises fine particles having an average particle size of 250 microns or less and a surface hydrophobic degree of 35 g or less, preferably 25 g or less, more preferably 20 g or less, as the oil absorption measured by the oil absorption assay method of JIS K6223.

(2) The substitute for edible oil and fat according to the item (1), wherein the fine particles have an average particle size of 250 microns or less, preferably 150 microns or less, more preferably 2.5 microns or less.

(3) The substitute for edible oil and fat according to the item (1) or (2), wherein the fine particles having an average particle size of 250 microns or less comprise fine particles of inorganic or organic substance and a hydrophobia substance adhered to the surface thereof.

(4) The substitute for edible oil and fat according to any one of the items (1) to (3), wherein the fine particles having an average particle size of 250 microns or leas comprise a hardly water-soluble substance having a solubility of 0.05 g or less in 100 ml of water at 25° C.

(5) The substitute for edible oil and fat according to the item (3) or (4), wherein the fine-particles having an average particle size of 250 microns or less comprise at least one substance selected from the group consisting of calcium carbonate, calcium tertiary phosphate, calcium secondary phosphate, magnesium carbonate and aluminum hydroxide.

(6) The substitute for edible oil and fat according to any one of the items (1) to (5), wherein the fine particles have three-dimensional shape.

(7) The substitute for edible oil and fat according to any one of the items (1) to (6), wherein the fine particles have spherical shape.

(8) A food which comprises the substitute for edible oil and fat according to any one of the items (1) to (7).

(9) A bakery product which comprises the substitute for edible oil and fat according to any one of the items (1) to (7).

BRIEF DESCRIPTION OF THE DRAWING

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
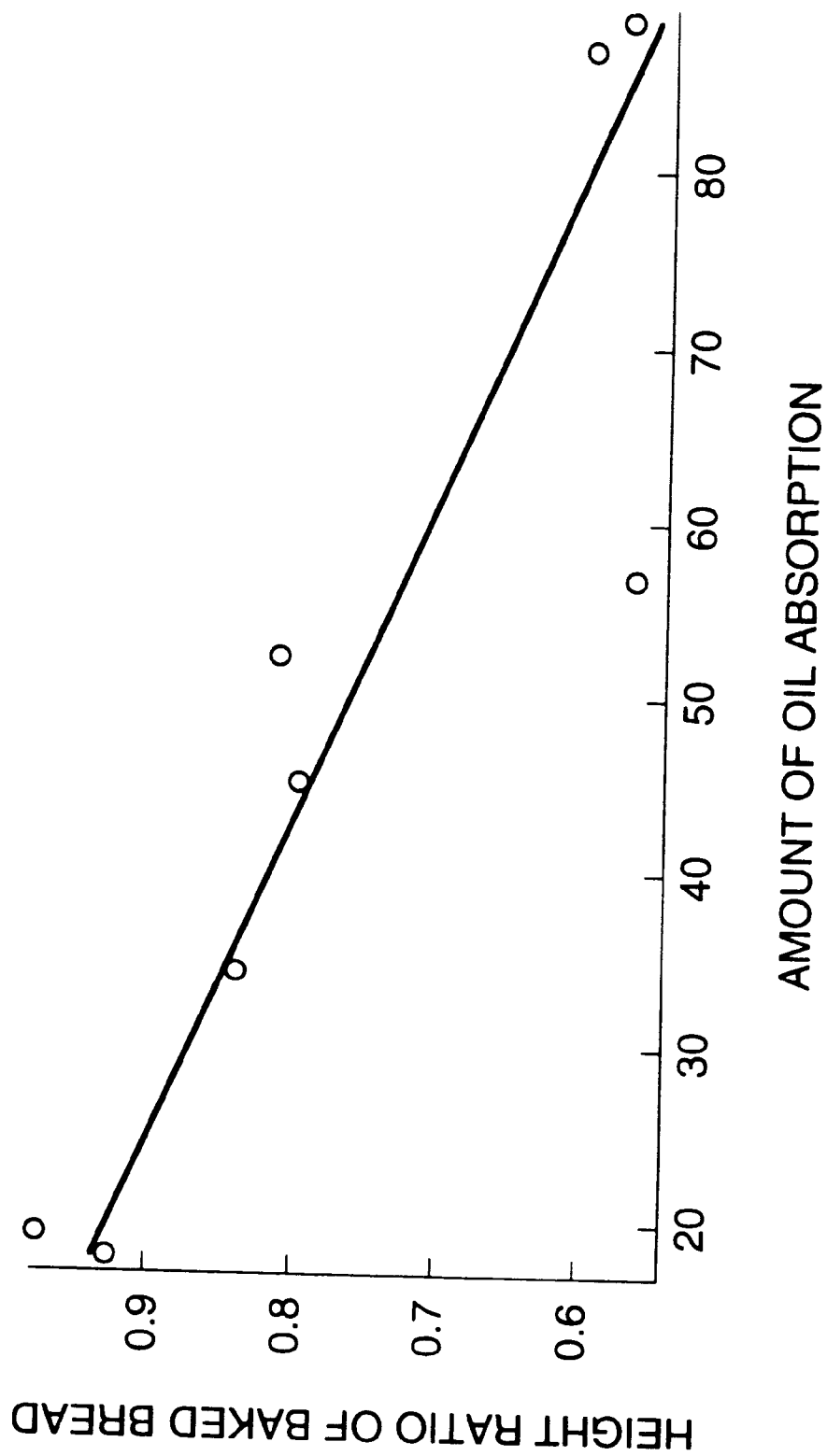
FIG. 1 is a graph showing a relationship between hydrophobic degree (oil absorption) of fine particles and height ratio of baked bread.

The fine particles to be used in the substitute for edible oil and fat of the invention are fine particles having an average particle size of 250 microns or less and a surface hydrophobic degree of 35 g or less defined as the value of oil absorption measured by the oil absorption assay method of JIS K6223.

The fine particles to be used in the substitute for edible oil and fat of the invention are divided into a case of "fine particle carrier (a composition of only fine particles)" and a case of "hydrophobic substance-adhered fine particles" in which a hydrophobic substance is adhered to the fine particle carrier, and both of these cases are included in the invention unless otherwise noted.

The average particle size of the fine particles is preferably 150 microns or less, more preferably 2.5 microns or less.

Measurement of the average particle size is as follows.

Fine particles are thoroughly dispersed in special grade methanol and measured using a laser diffraction type particle size measuring apparatus (LA-920) manufactured by Horiba Ltd. After the measurement, median value of the particle size was used as the average particle size.

Also, it is desirable that the fine particle has a "three-dimensional shape". The "three-dimensional shape" is used herein as a term which means that it is riot in the form such as of plate, film, fiber or needle, and its typical shape is spherical. However, it is not necessarily in strictly spherical shape, and it may for example be a spherical form having irregular surface as a pulverized state or a particle of three-dimensional shape close to the condition.

The hydrophobic degree of the surface of fine particles is a value measured by the oil absorption assay method of JIS K6223. When the surface of fine particles is hydrophobic, aggregation occurs with smaller oil content due to good conformability with liquid paraffin, and the oil absorption becomes large when the surface is hydrophilic.

The measuring method is as follows.

About 2 g of a sample is accurately weighed and put on a glass plate of about 20 cm square. Separately, liquid paraffin (special grade) is put into a 10 ml capacity beaker and weight together with a glass rod. The sample on the glass plate is thoroughly kneaded with a iron spatula while adding the liquid paraffin drop by drop. The end point is defined as a rapidly softened point by adding one drop of paraffin to the aggregated and solidified sample. By obtaining the g number of the used liquid paraffin (to be referred also to as "used oil" hereinafter), oil absorption (amount of liquid paraffin) per 100 g of sample is calculated by the following formula.

Oil absorption=[used oil (g)]/[mass of sample (g)]×100 (unit: g/100 g; also referred to as "g" in this specification)

It is necessary that the fine particles to be used in the present invention have an oil absorption of 35 g or less measured by this method, but they are fine particles preferably having an oil absorption of 25 g or less, more preferably having an oil absorption of 20 g or less.

Regarding a relationship between oil absorption and particle size, the oil absorption undergoes influence by the surface area of the fine particles. Table 1 shows values of the oil absorption when the average particle size of calcium carbonate prepared by sufficiently adhering stearic acid to the surface is reduced. As shown in Table 1, the oil absorption becomes slightly large as the particle size becomes small, but it is assumed that a difference based on the properties of the substance such as fine particles is sufficiently large.

TABLE 1

| Particle size (mm) | Oil absorption (g) |
|---|---|
| 150 | — |
| 12.1 | 15.9 |
| 3.3 | 17.8 |
| 1.9 | 17.8 |
| 0.8 | 18.5 |

The fine particles to be used in the substitute for oil and fat of the invention are divided into two cases, namely a case in which these values are obtained by a fine particle carrier (a composition of fine particles only) and a case in which these values are obtained by adhering a hydrophobic substance to the fine particle carrier. In the latter case, non-limiting examples of the hydrophobic substance to be adhered include fatty acids, fatty acid salts, triglycerides, diglycerides, monoglycerides, phospholipids, glycolipids and various emulsifying agents. Most preferred are fatty acids and fatty acid salts.

The term "adhesion" as used herein means that a hydrophobic substance is adhered to the surface of fine particle carrier, and the hydrophobic substance may be present on the surface either uniformly or irregularly. Also, it is a concept which includes that the hydrophobic substance is adsorbed to the surface of fine particle carrier physically or chemically.

Though the adhesion method is not particularly limited, the following method is typically used.

Fine particles are heated to about 100° C. and then a hydrophobic substance to be used in the invention is added thereto. While keeping the same temperature, the mixture is stirred for 20 to 30 minutes using a Henschel mixer to obtain a hydrophobic substance-adhered fine particles which are subsequently cooled to about room temperature.

It is desirable that the hydrophobic substance to be used in the present invention is added in an amount of larger than 0.2% by weight based on the fine particle carrier, in order to reduce the oil absorption. Adhesion amount of 1.0% by weight or more is more desirable. In the case of adhesion of a lipid, calories will increase when the adhesion is carried out with a large amount of the lipid, so that its amount is preferably 10% or less based on the fine particle carrier.

In that case, the shortness effect cannot be obtained in bread production when the hydrophobic substance and fine particle carrier are separately added to the food, so that it is essential to adhere the substance firstly to the surface of fine particle carrier and then add to the food.

The material of fine particle carrier may have a solubility of preferably 0.05 g/100 g water (25° C.) or less, and its examples include those which have extremely low solubility in water, such as calcium carbonate, calcium tertiary phosphate, calcium secondary phosphate, magnesium carbonate and aluminum hydroxide It may be either an inorganic substance or an organic substance but preferably an inorganic substance. As a matter of course, it may be a mixture thereof, and other materials which contain these substances as the main components, such as egg shell calcium, fish bone calcium, cattle bone calcium, shell calcium and coral calcium, can also be used in the present invention.

As the embodiment using the fine particles in the present invention, particles alone may be used or particles may be used by mixing with edible oil and fat at an optional ratio, because these two do not show a large difference in the influence upon bread making properties. However, lower oil and fat content is desirable when low calories and low oil content are taken into consideration.

Use of the substitute for edible oil and fat according to the present invention can make the amount the oil and fat contained in foods to be reduced or to be zero. At the same time, the effects of oil and fat to improve the quality of foods (food quality-improving effects, especially, shortness effect) can be obtained by using the substitute for edible oil and fat according to the present invention. The oil and fat to be reduced or replaced are not particularly limited as long as they are use for foods and examples thereof include various types of vegetable oils and fats and various types of animal oils and fats which are used or contained in foods.

The method to add the substitute for edible oil and fat according to the present invention is not particularly limited and it is preferable to homogeneously mix the substitute for edible oil and fat with foods, for example, by powder mixing or the like. The amount of the substitute for edible oil and fat is not particularly limited, but preferably from 0.1% to 60% by weight, more preferably from 0.5% to 40% by weight, based on the total weight of the food. The substitute for edible oil and fat may be added at any step for producing the food. In the case of the baked product, it is preferably to add the substitute for edible oil and fat before baking of the product.

A food which comprises the substitute for edible oil and fat of the invention also forms a part of the present invention. Examples of such food are not particularly limited and include foods which usually contain oil and fat, such as frozen dessert, salad dressing, mayonnaise, spread, cheese and cake. Foods may contain no oil and fat by using the substitute for edible oil and fat of the invention and such foods containing no oil and fat are also included in the present invention.

Various types of flour dough baked products can be cited as typical examples of food in which effect of the oil and fat substitute of the present invention is exerted straightforwardly. Examples of the "flour" include wheat flour, rye flour and barley flour, and what flour is preferable. The term "wheat flour dough baked product" as used herein is a concept which includes not only white bread, bun, French bread and Danish pastry but also doughnuts and pies in which fermentation is not carried out.

The dough before baking is also included in the present invention. The dough of the present invention is not particularly limited either leavened or unleavened. The dough comprises the flour and a liquid for kneading (e.g., water, milk, oils, egg, and so forth), and may further contain other commonly used components such as yeast, sugars, salts, skimmed milk, shorting, oil and fat, etc.

The "bake" and "baking" as used herein is not particularly limited and may include, for example, usual baking, steaming, frying and the like, preferably usual baking.

It is assumed that fine particles as the oil and fat substitute of the present invention have the following functions. That is, the role of a solid fat such as margarine or shortening is to greatly expand bread at the time of its fermentation and baking and thereby to finish it into a bread having fine texture. In general, when wheat flour is kneaded by adding water at the time of bread dough productions gluten is formed and elasticity is generated in the dough. When oil and fat are not used, gluten is mutually adhered and becomes a considerably thick filamentous material having poor extensibility, so that the dough can hardly extend at the time of fermentation and baking and is made into a bread having rough texture and small specific volume. However, when oil and fat are added, gluten becomes a thin and extensible state, so that the dough is expanded at the time of fermentation and baking and is made into a bread having fine texture and large specific volume. It has been observed that gluten becomes thin and extensible state when the fine particles of the invention are added.

Thus, fine particles having hydrophobic surface exert functions equivalent to the oil and fat crystals in the solid fat.

Having generally described this invention, a further understanding can be obtained by reference to certain specific examples which are provided herein for purposes of illustration only and are not intended to be limiting unless otherwise specified.

EXAMPLE 1

Production conditions and production method of bread dough and bread, and evaluation method of bread Using the white bread materials having the formulation shown in Table 2 and respective fine particles shown in Table 3, white bread was produced using a household bread making machine and evaluation of the bread was carried out.

The height of bread to which 10% by weight of shortening was added was defined as 100, and the height of bread to which 10% by weight of respective fine particles were added was shown by their ratio (Table 4).

TABLE 2

(Formulation of materials for white bread)

| | |
|---|---|
| Hard wheat flour | 100 parts by weight |
| Sugar | 6 parts by weight |
| Table salt | 1.7 parts by weight |
| Raw yeast | 2.1 parts by weight |
| Water | 75 parts by weight |

TABLE 3

(Various fine particles)

Refined crystalline cellulose (average particle size: 10 microns)
Refined silicon dioxide (average particle size: 2 microns)
Refined soybean shell powder (average particle size: 7 microns)
Aluminum hydroxide: Hidilite H-32 (average particle size: 3.5 microns)
Its surface-treated product: surface-treated amount of stearic acid
        0.4% by weight
Talc: Hifiller K-5 (average particle size: 5 microns)
Its surface-treated product: surface-treated amount of stearic acid
        6% by weight
Calcium carbonate: Eskalon 800 (3.3 microns)
Its surface-treated product: surface-treated amount of stearic acid
        1% by weight

TABLE 4

| | Height ratio | Oil absorption |
|---|---|---|
| Shortening | 100 | |
| Fine crystalline cellulose (10 microns) | 59.8 | 86.7 |
| Refined silicon dioxide (2 microns) | x | 311.8 |
| Refined soybean shell powder (7 microns) | 57.2 | 88.4 |
| Aluminum hydroxide (3.5 microns) | 84.3 | 34.2 |
| Its surface-treated product | 97.5 | 19.2 |
| Talc (5 microns) | 56.4 | 56.7 |
| Its surface-treated product | 81.5 | 52.1 |
| Calcium carbonate (3.3 microns) | 80.0 | 44.9 |
| Its surface-treated product | 92.7 | 17.8 | x: Impossible to prepare dough

A relationship between the oil absorption and the height ratio of baked bread based on the results of Table 1 is shown in FIG. 1 as a graph. In FIG. 1, only one point is significantly out of correlation, and this is considered to be due to the plate-like crystal structure of talc which is greatly different from the crystal structures of other fine substances. However, when this one point is excluded, a linear curve having markedly high correlation between these two phenomena can be obtained.

Y=1.042−0.0051897x
  y; height ratio of baked bread
  x; oil absorption

Based on the above formula, it is necessary to use fine particles having an oil absorption of 35 g or less in order to obtain a bread height of 85% by adding shortening in a minimum amount which can be evaluated as a bread and by adding 10% by weight of fine particles, However, it is desirable to use fine particles having an oil absorption of 25 g or less which can give a bread height of 90% when shortening is added, and it is more desirable to use fine particles having an oil absorption of 20 g or less which can give a bread height of 95% when shortening is added.

EXAMPLE 2

By varying average particle size of calcium carbonate in which 1% by weight of stearic acid was adhered to t0he surface, the height of bread after bread making was measured in the same manner as described in Example 1.

TABLE 5

| Average particle size of calcium carbonate | Oil absorption | Height ratio (when shortening is 100) |
|---|---|---|
| 150 microns | — | 92.2 |
| 12.1 microns | 15.9 | 91.3 |
| 3.3 microns | 17.8 | 92.7 |
| 1.9 microns | 17.8 | 99.4 |

It can be seen from Table 5 that, in order to obtain a white bread having a height of 90% or more based on the height of the bread of the addition of shortening, it is preferable to use fine particles having an average particle size of 150 microns or less among fine particles having an average particle size of 250 microns or less, more preferably to use fine particles having an average particle size of 2.5 microns or less.

EXAMPLE 3

Using calcium carbonate having an average particle size of 1.9 microns and changing the amount of a hydrophobic substance (stearic acid in this test) to be adhered to the surface, the height of bread after bread making was measured in the same manner as described in Example 1.

TABLE 6

| Amount of stearic acid (% by weight) (based on calcium carbonate) | Oil absorption | Height ratio of baked bread |
|---|---|---|
| 0 | 47.8 | 76.1 |
| 0.2 | 37.7 | 88.3 |
| 1.0 | 17.8 | 99.5 |
| 3.0 | 18.4 | 100 |

It can be seen from Table 6 that surface-adhesion of 0.2% by weight of stearic acid is effective in increasing the bread volume, but surface-adhesion of 1.0% by weight or more of stearic acid is more desirable.

EXAMPLE 4

Using calcium carbonate having an average particle size of 1.9 microns and changing kinds of the hydrophobic substance to be adhered to the surface in an amount of 1% by weight based on calcium carbonate, the height of bread after bread making was measured in the same manner as described in Example 1. Oil absorption of the fine particles was also measured.

TABLE 7

| Hydrophobic substance | Oil absorption | Height ratio of baked bread |
|---|---|---|
| Stearic acid | 16.7 | 100 |
| Lauric acid | 17.5 | 101.5 |
| Tristearin | 26.1 | 94.4 |

According to Table 7, tristearin can be used sufficiently as a hydrophobic substance, but a fatty acid such as stearic acid or lauric acid or a fatty acid salt is more desirable.

EXAMPLE 5

By the same method of Example 1, amount of calcium carbonate in which 1% by weight of stearic acid was adhered to the surface was changed, and the height of bread after bread making was measured in the same manner as described in Example 1.

TABLE 8

| Amount of calcium carbonate added (% by weight) | Height ratio of baked bread |
|---|---|
| 10 | 100 |
| 5 | 94.0 |
| 2.5 | 93.3 |

According to Table 8, 2.5% by weight is sufficiently effective as the amount of calcium carbonate to be added, but more superior effect is obtained by the added amount of 10% by weight.

EXAMPLE 6

Using calcium carbonate having an average particle size of 1.9 microns in which 1% by weight of stearic acid was adhered to the surface, bread making was carried out by mixing with other oil and fat by the same method of Example 1 and the height of bread after bread making was measured.

TABLE 9

| | Height ratio of baked bread |
|---|---|
| 10% of usual shortening | 100 |
| 10% by weight of calcium carbonate in which 1% by weight of stearic acid was adhered to the surface | 98.3 |
| 5% by weight of calcium carbonate in which 1% by weight of stearic acid was adhered to the surface +5% by weight of liquid oil | 98.1 |

According to Table 9, it was possible to bake bread by the use of fine particles mixed with liquid oil almost in the same manner as the case of calcium carbonate alone.

EXAMPLE 7

Based on the formulation shown in Table 10, baked bread was produced by the sponge (70%) and dough method, and the bread was evaluated.

Using a vertical mixer (Aikosha Mixer) and a hook, the sponge materials shown in Table 1 which were put into a bowl were mixed at a low speed for 3 minutes and at a middle speed for 2 minutes, and a sponge was prepared at a kneading temperature of 24° C. Next, this was fermented (sponge fermentation) at sponge fermentation temperature of 27° C. and at sponge fermentation relative humidity of 80% for sponge fermentation period of 2 hours.

(though fine particles can be added at this sponge preparation step, they can also be added at the main kneading step without problem, so that the fine particles were added at the main kneading step in this example.)

TABLE 10

| (Sponge materials) | |
|---|---|
| Hard wheat flour | 70 parts by weight |
| Raw yeast | 2 parts by weight |
| Yeast food | 0.1 parts by weight |
| Water | 42 parts by weight |

Next, the main knead formulation materials shown in Table 11 were added to this fermented sponge and mixed at a low speed for 3 minutes, at a middle speed for 2 minutes and at a high speed for 1 minute, and then fine particles [calcium carbonate fine powder, mfd. by Sankyo Seifun, in which stearic acid was adhered to the surface (1% by weight addition based on the fine particles)] were added in an amount of 6% by weight and mixed at a low speed for 3 minutes, at a middle speed for 2 minutes and at a high speed for 1 minute, thereby obtaining main knead dough. Temperature of the main knead dough was set to 20° C.

In order to restore the dough damaged by the mixing, 20 minutes of floor time was taken and then the dough was divided into 80 g portions. In order to restore the dough damaged by the division, 20 minutes of bench time was taken at room temperature and then reshaped with a molder.

After the reshaping, final fermentation was carried out. Fermentation conditions are shown below.
Fermentation temperature: 38° C.
Fermentation relative humidity: 80%
Fermentation time: 45 minutes

TABLE 11

| (Main knead formulation materials) | |
|---|---|
| Hard wheat flour | 30 parts by weight |
| Sugar | 10 parts by weight |
| Skim milk powder | 2 parts by weight |
| Table salt | 1.4 parts by weight |
| Raw yeast | 5 parts by weight |
| Dough modifier | 0.7 parts by weight |
| Water | 21 parts by weight |

The bread dough prepared in this manner was baked in an oven of upper side 195° C. and lower side 205° C. for 10 minutes and 30 seconds. After the baking, this was spontaneously cooled at room temperature and then its volume was measured and its texture was observed. The results are shown in Table 12.

TABLE 12

| | Volume |
|---|---|
| Usual shortening 6% by weight | 100 |
| Calcium carbonate (1.9 microns, 1% by weight of stearic acid was adhered on the surface) 6% by weight | 99.3 |

EXAMPLE 8

Hard cookies were produced based on the formulation shown in Table 13, and evaluation of the oil and fat substitution function was carried out.

TABLE 13

| Materials | Comparative Example 1 | Example 8 |
|---|---|---|
| Soft flour | 300 g | 300 g |
| Salt-free butter | 75 g | — |
| Table salt | 2 g | 2 g |
| Granulated sugar | 100 g | 100 g |
| Egg | 60 g | 60 g |
| Water | — | 30 g |
| Hydrophobic substance-adhered fine particles | — | 30 g |
| Liquid oil | — | 37.5 g |

While stirring liquid oil, hydrophobic substance-adhered fine particles and granulated sugar using a Hobart mixer, egg and water were added thereto and then soft flour and table salt were added, and the mixture was stirred for a total of about 10 minutes. Added amount of each material is as shown in Table 13. Thereafter, the mixture was formed into a shape of rod having a diameter of 4 to 5 cm by lightly kneading it with hands, wrapped up in a lapping sheet to prevent drying and then allowed to stand at 5° C. for 1 hour in a refrigerator. In this case, the hydrophobic substance-adhered fine particles shown in Table 13 are calcium carbonate to which 1% by weight of stearic acid was adhered, having an average particle size of 1.9 microns and an oil absorption of 16.7 g.

Next, the rod-shaped dough was cut to a size of 20 g and made into the same size of dough preparations using a cylindrical cookie mold. After 15 minutes of baking at 180° C. and subsequent spontaneous cooling, height of the cookies was measured and their crisp feeling was evaluated.

A total of 10 cookies were produced for the measurement to calculate average value of the height.

For the evaluation of crisp feeling, sensory evaluation test was carried out on the basis of 5 points, and average value by five members was calculated.

In Comparative Example 1, salt-free butter was used instead of the liquid oil, hydrophobic substance-adhered fine particles and water used in Example 8. Cookies were prepared in the same manner except for the composition shown in Table 13. The results are shown in Table 14.

TABLE 14

|  | Comparative Example 1 | Example 8 |
|---|---|---|
| Height | 9.8 cm | 9.4 cm |
| Crisp feeling | 3 | 2.8 |

When hydrophobic substance-adhered fine particles are used like the case of this example, similar cookie height can be obtained even if the oil and fat content is reduced by half.

In this connection, when oil and fat were not added in this example, biscuits after baking did not swell and crisp feeling was not obtained too.

As is evident from the above results, the fine particles of the invention and compositions containing the same are useful as substitutes for edible oil and fat, which can be used in bakery products, and they are substitutes for edible oil and fat, which can he used not only for the preparation of bread dough for home bread making machine use but also in the sponge and dough method used for example in the general bakery.

While the invention has been described in detail and with reference to specific embodiments thereof, it will be apparent to one skilled in the art that various changes and modifications can be made therein without departing from the spirit and scope thereof.

This application is based on Japanese patent applications No. Hei. 11-341571 filed on Dec. 1, 1999 and No. 2000-328520 filed on Oct. 27, 2000, the entire contents of each being hereby incorporated by reference.

What is claimed is:

1. A substitute for edible oil and fat, which comprises fine particles having an average particle size of 250 microns or less and a surface hydrophobic degree of 35 g or less as the oil absorption measured by the oil absorption assay method of JIS K6223.

2. The substitute for edible oil and fat of claim 1, wherein said fine particles further comprise a hydrophobic substance adhered to a surface of a fine particle carrier.

3. The substitute for edible oil and fat of claim 2, wherein said hydrophobic substance is selected from the group consisting of a fatty acid, a fatty acid salt, a triglyceride, a diglyceride, a monoglyceride, a phospholipid, a glycolipid, an emulsifying agent and a mixture thereof.

4. The substitute for edible oil and fat of claim 2, wherein said hydrophobic substance is present in an amount of from 0.2 to 10 wt. %, based on the weight of fine particle carrier.

5. A substitute for edible oil and fat, which comprises fine particles having an average particle size of 250 microns or less and a surface hydrophobic degree of 25 g or less as the oil absorption measured by the oil absorption assay method of JIS K6223.

6. A substitute for edible oil and fat, which comprises fine particles having an average particle size of 2.5 microns or less and a surface hydrophobic degree of 25 g or less as the oil absorption measured by the oil absorption assay method of JIS K6223.

7. The substitute for edible oil and fat according to any one of claims 1 to 6, wherein said fine particles comprise fine particles of an inorganic or organic substance and a hydrophobic substance adhered to the surface thereof.

8. The substitute for edible oil and fat according to any one of claims 1 to 6, wherein said fine particles comprise a hardly water-soluble substance having a solubility of 0.05 g or less in 100 ml of water at 25° C.

9. The substitute for edible oil and fat according to any one of claims 1 to 6, wherein said fine particles have three-dimensional shape.

10. The substitute for edible oil and fat according to any one of claims 1 to 6, wherein said fine particles comprise at least one substance selected from the group consisting of calcium carbonate, calcium tertiary phosphate, calcium secondary phosphate, magnesium carbonate and aluminum hydroxide.

11. A food which comprises the substitute for edible oil and fat according to any one of claims 1 to 6.

12. The food of claim 11, which comprises 0.1 to 60 wt. % based on the total weight of said food of said substitute for edible oil and fat.

13. A bakery product which comprises the substitute for edible oil and fat according to any one of claims 1 to 6.

14. A method of preparing a food comprising:

mixing a substitute for edible oil and fat, with components of food, wherein said substitute for edible oil and fat comprises fine particles having an average particle size of 250 microns or less and a surface hydrophobic degree of 35 g or less as the oil absorption measured by the oil absorption assay method of JIS K6223.

15. A method of extending gluten comprising:

kneading flour and water in the presence of a substitute for edible oil and fat which comprises fine particles having an average particle size of 250 microns or less and a surface hydrophobic degree of 35 g or less as the oil absorption measured by the oil absorption assay method of JIS K6223.

16. The flour dough comprising:

i) flour; and ii) A substitute for edible oil and fat which comprises fine particles having an average particle size of 250 microns or less and a surface hydrophobia degree of 35 g or less as the oil absorption measured by the oil absorption assay method of JIS K6223.

* * * * *